United States Patent [19]

Hisajima et al.

[11] Patent Number: 5,275,010
[45] Date of Patent: Jan. 4, 1994

[54] CONTROL METHOD AND APPARATUS OF ABSORPTION CHILLER HEATER

[75] Inventors: Daisuke Hisajima, Ibaraki; Tomihisa Ohuchi, Tsukuba; Akira Nishiguchi, Ushiku; Yasuo Koseki, Hitachiota; Michihiko Aizawa, Ushiku; Hiroaki Yoda, Tsuchiura; Takashi Nakao, Ibaraki, all of Japan

[73] Assignee: Hitachi, Ltd., Tokyo, Japan

[21] Appl. No.: 933,209

[22] Filed: Aug. 21, 1992

[30] Foreign Application Priority Data

Aug. 23, 1991 [JP] Japan .................. 3-237328

[51] Int. Cl.$^5$ ............................. F25B 15/00
[52] U.S. Cl. ......................... 62/148; 62/105
[58] Field of Search .............. 62/141, 148, 105, 184

[56] References Cited

U.S. PATENT DOCUMENTS

| 2,480,497 | 8/1949 | Meyer ................... 62/184 X |
| 2,550,665 | 5/1951 | Berestneff et al. ........ 62/184 X |
| 3,187,515 | 6/1965 | Swearingen ............. 62/105 X |

Primary Examiner—William E. Wayner
Attorney, Agent, or Firm—Antonelli, Terry, Stout & Kraus

[57] ABSTRACT

An individual air conditioning system with an absorption chiller heater having a controllable capacity, with thermal input to a burner of a high temperature regenerator being controlled by on-off control or the like even if the load is low. The temperature of cooling water is controlled in accordance with a concentration of refrigerant in an absorber, so that the refrigerating capacity of the absorption chiller heater can be freely varied from 0% to 100% without the refrigerant being frozen.

14 Claims, 9 Drawing Sheets

CONTROL METHOD AND APPARATUS OF ABSORPTION CHILLER HEATER

BACKGROUND OF THE INVENTION

The present invention relates to a control method of an absorption chiller heater and, more particularly, to a control method of an absorption chiller heater which is suitable for an air conditioning system in which demand for individual operations is large.

In the present air conditioning for buildings, there has been an increasing demand for individually operating indoor units for increased comfort, a number of rental rooms for tenants, flextime working and so forth. One method for answering such individual demands is disclosed in Japanese Patent Unexamined Publication Nos. 1-203839 and 1-212869. In these systems, a plurality of compressors are provided in a refrigerator, and the entire apparatus is operated in such a manner that the capacity of the compressors balances with a capacity required for air conditioning. This is because that in the refrigerator of a coolant compression type, it is difficult to perform control of decreasing the capacity and, if the capacity is decreased, the operational efficiency will be reduced. Consequently, such drawbacks are dealt with by on-off operation of the plurality of compressors in the above described manner. In another method, a small-capacity air conditioning outdoor unit is provided for each of indoor air conditioners. On the other hand, in a large-size air conditioner of a centralized control type with an absorption chiller heater or the like, operation of the main refrigerator itself is stopped after a certain time without meeting the demand for individual air conditioning.

When a plurality of compressors are provided or when a refrigerator is reduced in size and divided into dispersed units in order to satisfy the demand for individual air conditioning, not only the probability of troubles is increased but also the maintenance space is enlarged. Moreover, a large-size refrigerator of the centralized control type does not answer the demand for individual air conditioning.

SUMMARY OF THE INVENTION

It is therefore an object of the present invention to provide a control method of an absorption chiller heater and an apparatus therefor to realize a multiple-type air conditioning system which induces less avoids the difficulties encountered in the prior art and is efficient while using an absorption chiller heater having relatively easily controlled capacity although it has a large size.

The above-mentioned object can be achieved by a method in which a condition of refrigerant in an evaporator of the absorption chiller heater is detected, and the cooling capacity of cooling water in an absorber is controlled in accordance with the detected condition of the refrigerant so that the refrigerant in the evaporator will not be frozen.

The object can be achieved by a method of detecting a refrigeration demand of the absorption chiller heater, and detecting a condition of refrigerant in an evaporator of the absorption chiller heater, in which a thermal input to a high temperature regenerator of the absorption chiller heater is controlled so that a thermal output of the absorption chiller heater during cooling operation follows up the refrigeration demand detected by the first detection means, and controlling the cooling capacity of cooling water in an absorber in accordance with the condition of the refrigerant detected so that the refrigerant in the evaporator will not be frozen.

The object can be achieved by an apparatus comprising a first detection means for detecting a refrigeration demand of the absorption chiller heater, a second detection means for detecting a condition of refrigerant in an evaporator of the absorption chiller heater, a first control means for controlling a thermal input to a high temperature regenerator of the absorption chiller heater so that a thermal output of the absorption chiller heater during cooling operation follows up the refrigeration demand detected by the first detection means, and a second control means for controlling the cooling capacity of cooling water in an absorber in accordance with the condition of the refrigerant detected by the second detection means so that the refrigerant in the evaporator will not be frozen.

When the refrigeration demand is decreased, the output of the absorption chiller heater can be controlled finely by on-off control of thermal input to the high temperature regenerator or by partially stopping a plurality of burners. Further, when the concentration of the absorbing solution in the absorber becomes high due to a decrease in the load, it is possible to prevent freezing of the refrigerant by decreasing the cooling capacity of the cooling water. In consequence, the absorption chiller heater can be operated in such a manner that the refrigeration capacity of the absorption chiller heater can be varied from 0% to 100%, and that an accident such as freezing of the refrigerant can be prevented. When it is applied to an air conditioning system, the user of an air-conditioned room can freely change the capacity of the indoor air conditioner without knowing operational conditions of the outdoor air conditioning apparatus.

DESCRIPTION OF THE PREFERRED EMBODIMENTS

Figure 1:
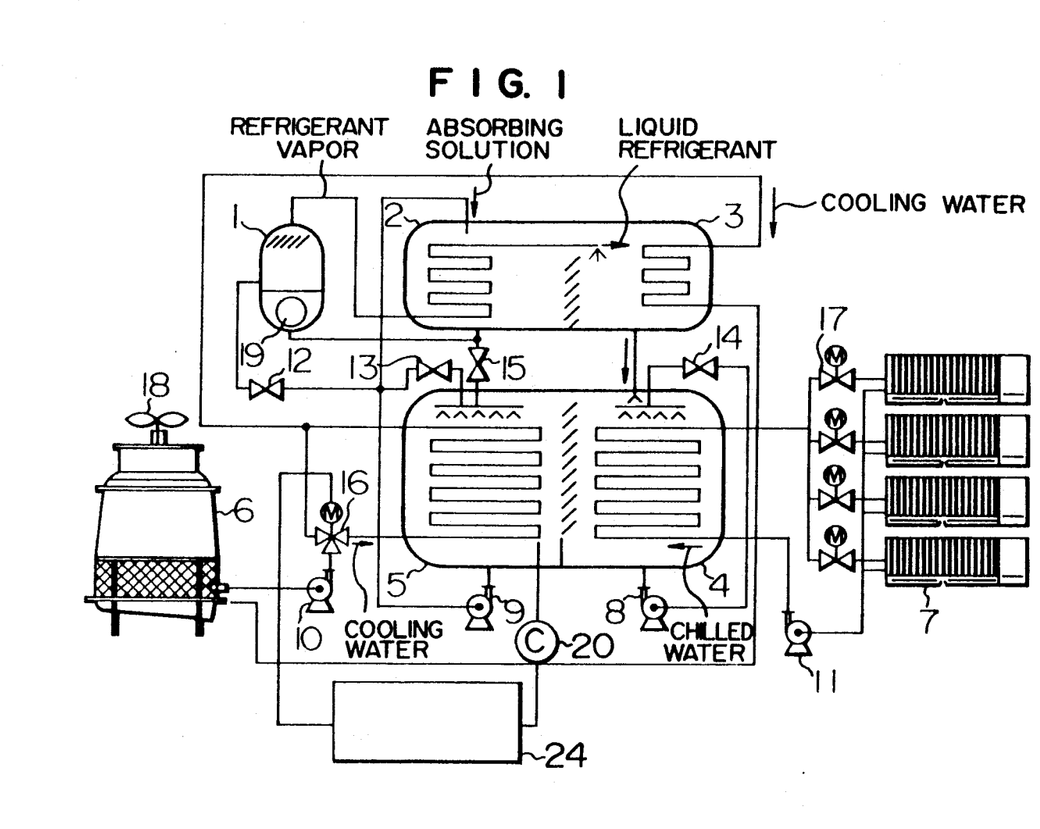
FIG. 1 is a schematic view of a cycle flow of one embodiment of an absorption chiller heater according to the present invention.

As shown in FIG. 1, an absorption chiller heater according to the present invention comprises a high temperature generator 1, a low temperature regenerator 2, a condenser 3, an evaporator 4, an absorber 5, a cooling tower 6, indoor air heat exchangers 7, and pipes and flow rate regulation valves for connecting these components. Refrigerant vapor generated from the high temperature regenerator 1 exchanges heat with absorbing solution supplied from the absorber 5 through an absorbing solution pump 9 to the low temperature regenerator 2, and, while evaporating refrigerant vapor in the absorbing solution the refrigerant vapor itself is condensed into liquid refrigerant and supplied to the condenser 3. The refrigerant vapor evaporated in the low temperature regenerator 2 exchanges heat with cooling water supplied through the absorber 5 and flowing in a condenser heat transfer pipe of the condenser 3, and, while heating the cooling water, the refrigerant vapor is condensed into liquid refrigerant. Such liquid refrigerant flows into the evaporator 4 and exchanges heat with chilled water supplied from a chilled water circulation pump 11 and flowing in an evaporator heat transfer pipe (this chilled water is heated by the air). While cooling the chilled water, the liquid refrigerant is evaporated into refrigerant vapor and flows into the absorber 5. The refrigerant which has not been evaporated in this process is sprinkled over the evaporator 4 again by means of a pump 8 and a valve 14. On the other hand, the chilled water is supplied to the indoor air heat exchangers 7 while its flow rate is controlled by a plurality of chilled water flow rate regulation valves 17 to thereby change the capacities of the indoor air heat exchangers 7. The chilled water exchanges heat with the air and cools the air. Thus heated, the chilled water is returned to the chilled water circulation pump 11. The refrigerant vapor generated in the evaporator 4 is absorbed by the absorbing solution dripping down on a heat transfer pipe in the absorber 5. Absorption heat generated then is removed by cooling water flowing in the absorber heat transfer pipe The absorbing solution which has dripped through the absorber 5 is supplied from the solution pump 9 through a flow rate regulation valve 12 to the high temperature regenerator 1. Simultaneously, it is supplied to the low temperature regenerator 2, and partially fed back to the absorber 5 through a flow rate, regulation valve 13. In the high temperature regenerator 1, the absorbing solution supplied from the absorber 5 is heated by a boiler 19 and partially changed into refrigerant vapor to be introduced into the low temperature regenerator 2. The concentrated absorbing solution is mixed with the concentrated absorbing solution returned from the low temperature regenerator 2 and dripped down to the absorber 5 while its flow rate is controlled by a flow rate regulation valve 15. Cooling water which has been cooled by dripping down in the cooling tower 6 is supplied to the condenser 3 through the absorber 5 by a cooling water pump 10. By a flow rate regulation three-way valve 16, however, the cooling water is partially supplied to the condenser 3 without passing through the absorber 5 and returned to the cooling tower 6. In this case, the opening degree of the flow rate regulation three-way valve 16 and the rotational speed of an air supply fan 18 of the cooling tower are controlled in accordance with a change in the refrigeration load so as to change the conditions of the cooling water, thereby controlling the cooling amount and completing the refrigeration cycle flow.

Figure 3:
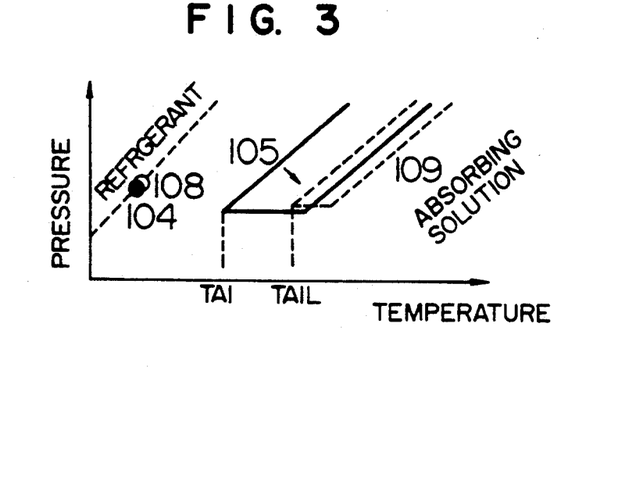
FIG. 3 is a graph showing a cycle condition in an absorber in the invention.

There is caused a fear that the refrigerant will be frozen in the evaporator 4 if a drop in the refrigerant temperature is left as it is. Therefore, the present invention is characterized in that cooling is performed in such a manner that the temperature of the absorbing solution when the refrigeration load is decreased is a temperature TAIL slightly higher than a temperature TAI under rated conditions, as shown in FIG. 3, so that even if the cycle is shifted to the high concentration side, the pressure will not be decreased. In this case, a condition of the refrigerant 104 (indicated with a filled circle) and a condition of the absorbing solution 105 (indicated with a solid line) at the time of rated operation are substantially the same as those of the conventional cycle. However, a condition of the refrigerant 108 (indicated with a blank circle) when the refrigeration demand is decreased is not very different from that of the rated operation, and a condition of the absorbing solution 109 (indicated with a dotted line) is different from that of the conventional cycle in that the pressure is not decreased.

Figure 2:
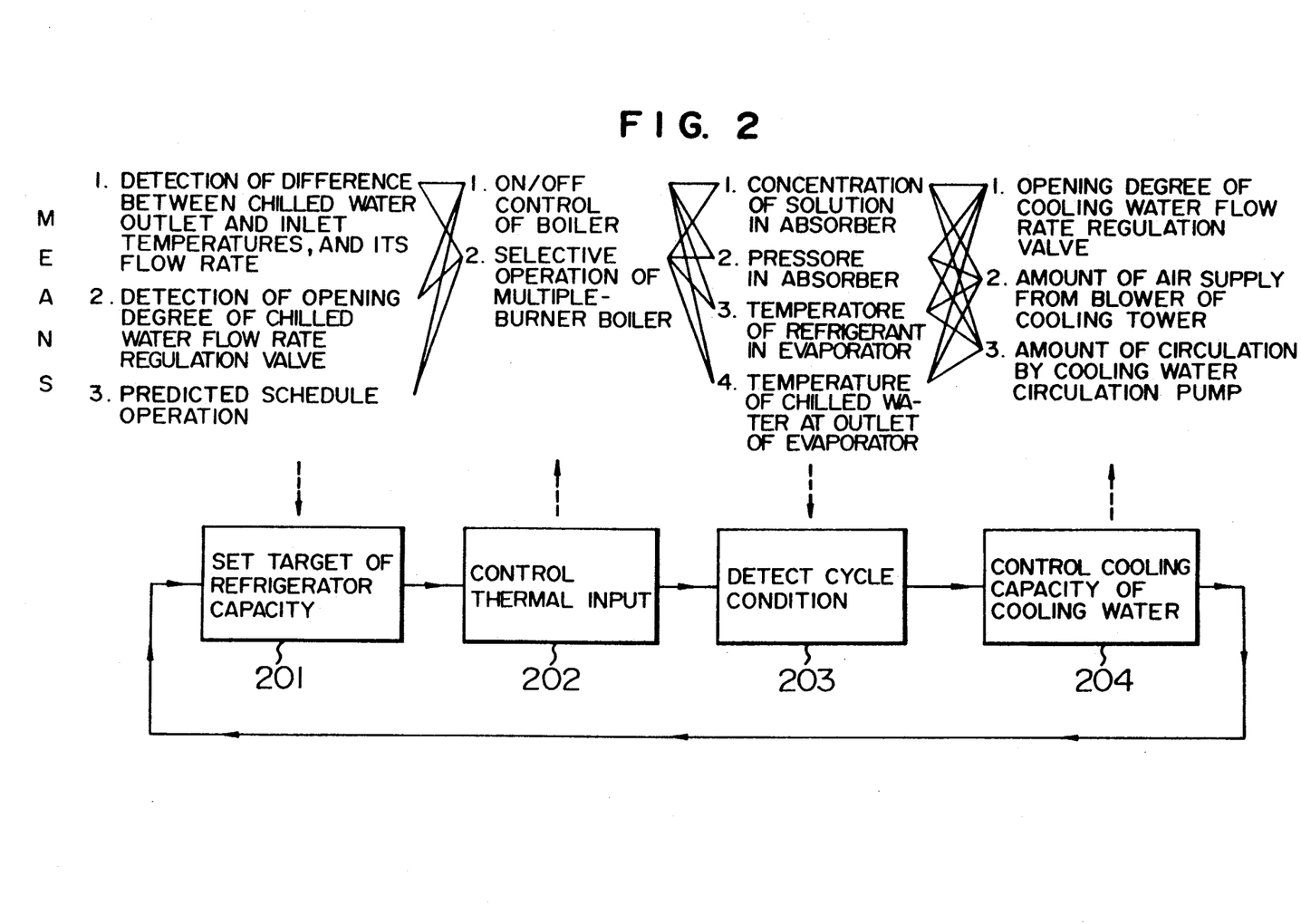
FIG. 2 is a flow chart showing one embodiment of control of the absorption chiller heater according to the invention.

In order to operate the above-described absorption chiller heater, control is performed in a control method illustrated in FIG. 2 in this embodiment. First, an amount of refrigeration demand is detected by detection of a difference in chilled water outlet and inlet temperatures and a flow rate, detection of an opening degree of the cold water flow rate regulation valve, predicted schedule operation or the like, and on the basis of this detection result, a target value of output from the absorption chiller heater is determined (Step 201). Next, in accordance with this predetermined value, the boiler of the high temperature regenerator 1 is turned on/off, or a multiple-burner boiler is selectively operated to increase/decrease the number of burners to ignite, so as to control the thermal input (Step 202). Then, the cycle condition is detected by detection of a concentration of the solution in the absorber, detection of a pressure in the absorber, detection of a temperature of the refrigerant in the evaporator, detection of a temperature of the chilled water at the outlet of the evaporator, or the like (Step 203). After that, in accordance with this detection result, the cooling capacity of the cooling water is controlled by regulation of the opening degree of the cooling water flow rate regulation valve, control of the amount of air supply from the cooling tower blower, control of the circulation amount by the cooling water circulation pump, or the like (Step 204).

When the refrigeration demand is changed in a manner indicated with a solid line 110 as time elapses, as a method for detecting the refrigeration demand in Step 201, it is possible to employ, for example, a method of measuring a difference in outlet and inlet temperatures of the chilled water and its flow rate at that time and calculating the load, a method of detecting an opening degree of the chilled water flow rate regulation valve 17 for controlling the capacities of the indoor air conditioners and predicting the load, and a method of schedule operation when the required load is predicted in advance in the case of lunch time, work ending time and so forth.

Figure 4:
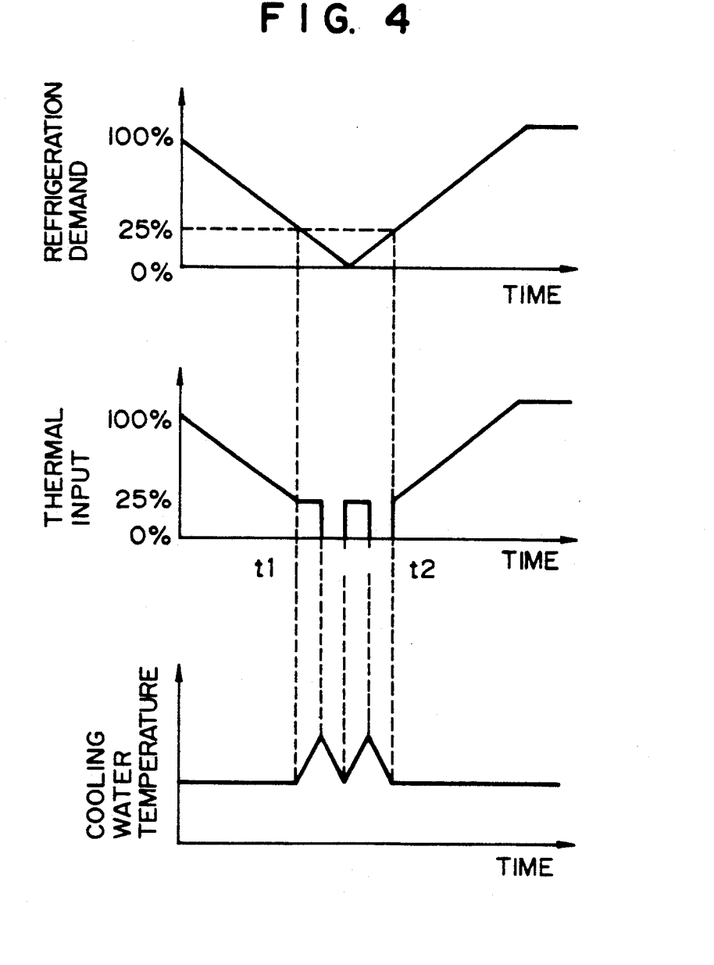
FIG. 4 is graphs showing an example of control conditions according to the invention.

Next, the thermal input control in Step 202 is usually effected by controlling the thermal input to the boiler 19 of the absorption chiller heater. Although the thermal input to the boiler 19 can be decreased until the refrigeration demand becomes about 25% of the rated operation, the refrigeration demand less than this level can not be dealt with by regulating the capacity of the boiler 19 alone. One method of solving such a problem is to conduct ON-OFF operation of the boiler 19 between time t1 and time t2, as shown in FIG. 4, when the refrigeration load is 25% or less. In this case, the absorption cycle is shifted to the high concentration side during the operation periods (ON) between t1 and t2 because the refrigerating capacity exceeds the demand, and the absorption cycle is shifted to the low concentration side during the stop periods (OFF). Therefore, control is effected to increase the cooling water temperature in the operation periods and to decrease it in the stop periods. This control method of the cooling water temperature will be described later. In another method for controlling the boiler thermal input, a plurality of boilers are installed so that when the refrigeration load is 25% or less, operation of some of the boilers will be stopped.

Detection of the cycle condition in the absorber in Step 203 will be carried out as follows. Absorbing solution often used in the absorption chiller heater is bromide lithium solution, and this solution has a concentration at which the solute starts to be precipitated and crystallized. Consequently, it is necessary to shift the concentration in the absorber 5 to such a degree as not to reach that concentration. For this reason, in the embodiment shown in FIG. 1, a concentration meter 20 for measuring the absorbing solution concentration is provided in the absorber 5. This can be realized by using, for example, glass fibers. When the concentration measured by the concentration meter 20 is increased, control in Step 204 is performed by closing the three-way valve 16 gradually by a controller 24 in order to decrease an amount of the cooling water flowing in the absorber 5. When the concentration measured by the concentration meter 20 is further increased and approaches the crystallization concentration, the boiler 19 is stopped to thereby stop concentrating of the absorbing solution in the regenerators 1 and 2. When the concentration of the solution in the absorber 5 in this condition regains the value of the rated conditions, the cooling water flow rate is returned to the original value, and the boiler 19 is actuated.

Figure 5:
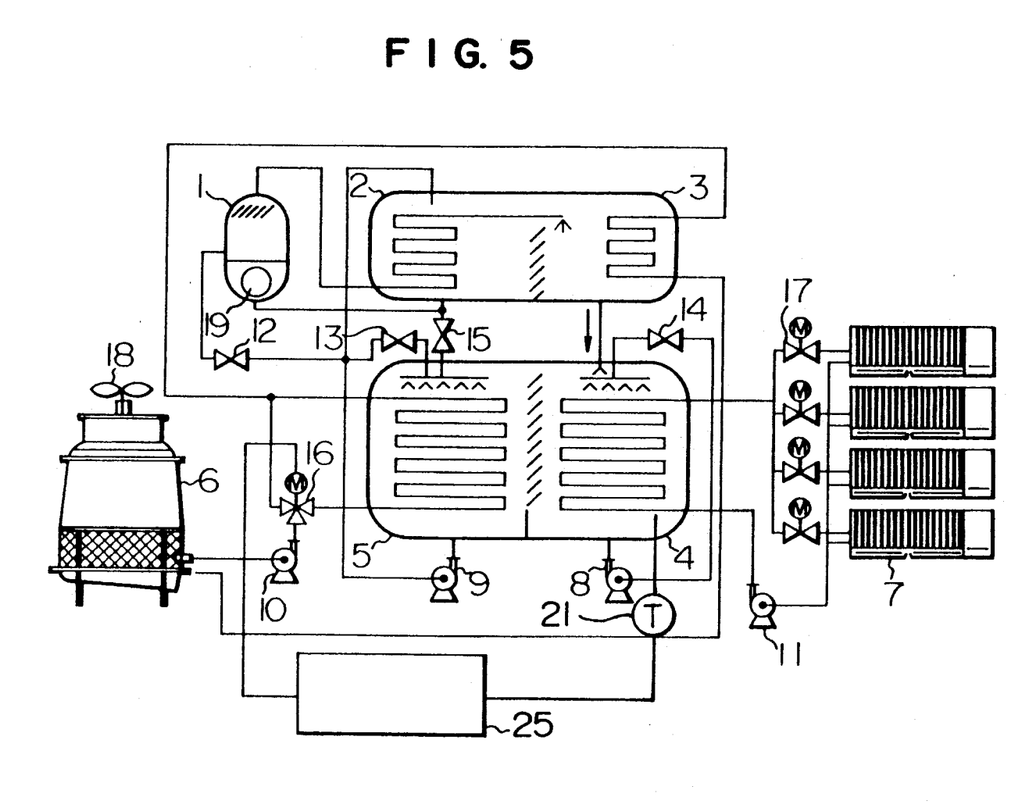
FIG. 5 is a diagram of a cycle flow, showing one embodiment of an absorption chiller heater according to the invention.
Figure 6:
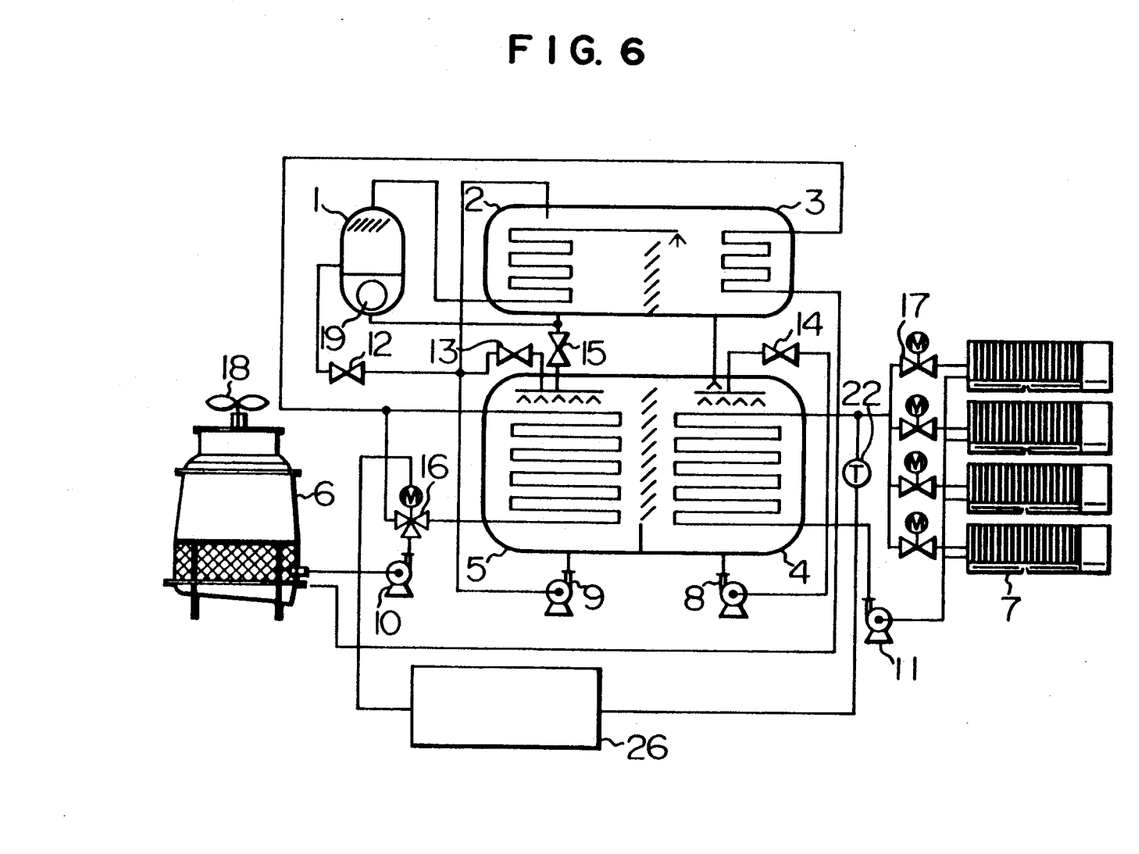
FIG. 6 is a diagram of a cycle flow, showing another embodiment of an absorption chiller heater according to the invention.
Figure 7:
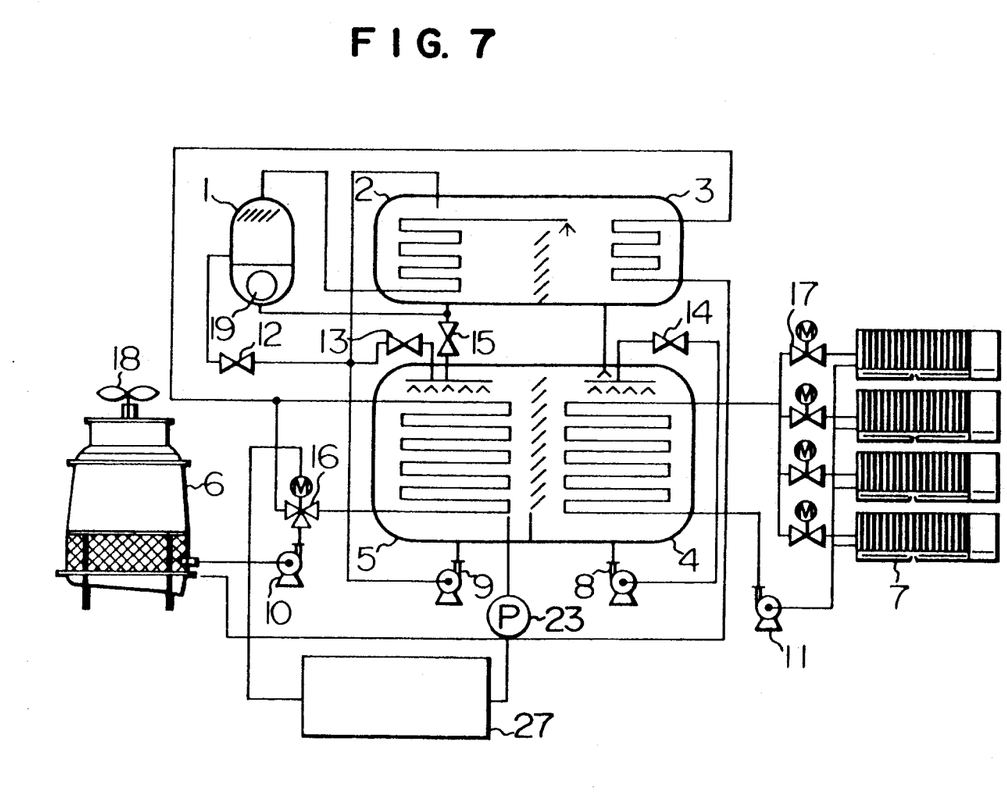
FIG. 7 is a diagram of a cycle flow, showing another different embodiment of an absorption chiller heater according to the invention.
Figure 8:
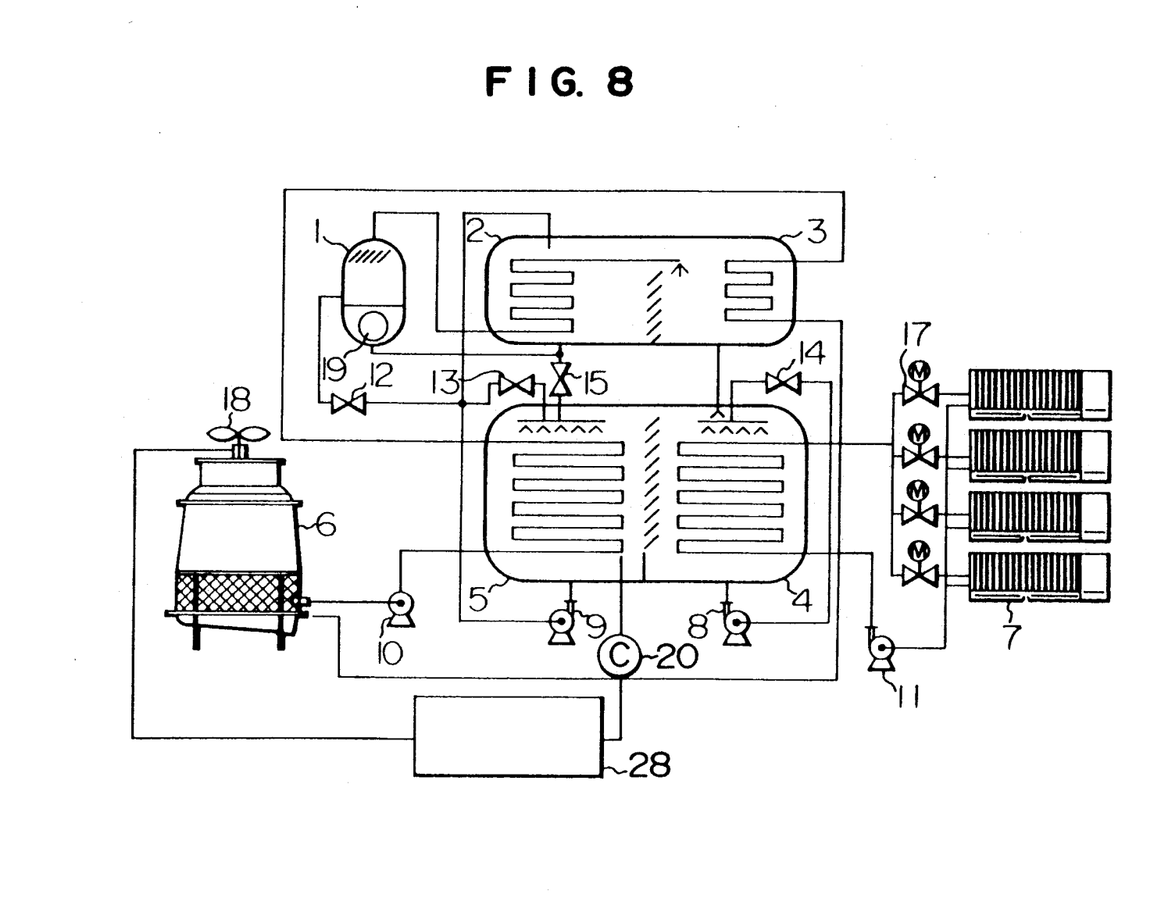
FIG. 8 is a diagram of a cycle flow, showing a still other embodiment of an absorption chiller heater according to the invention.
Figure 9:
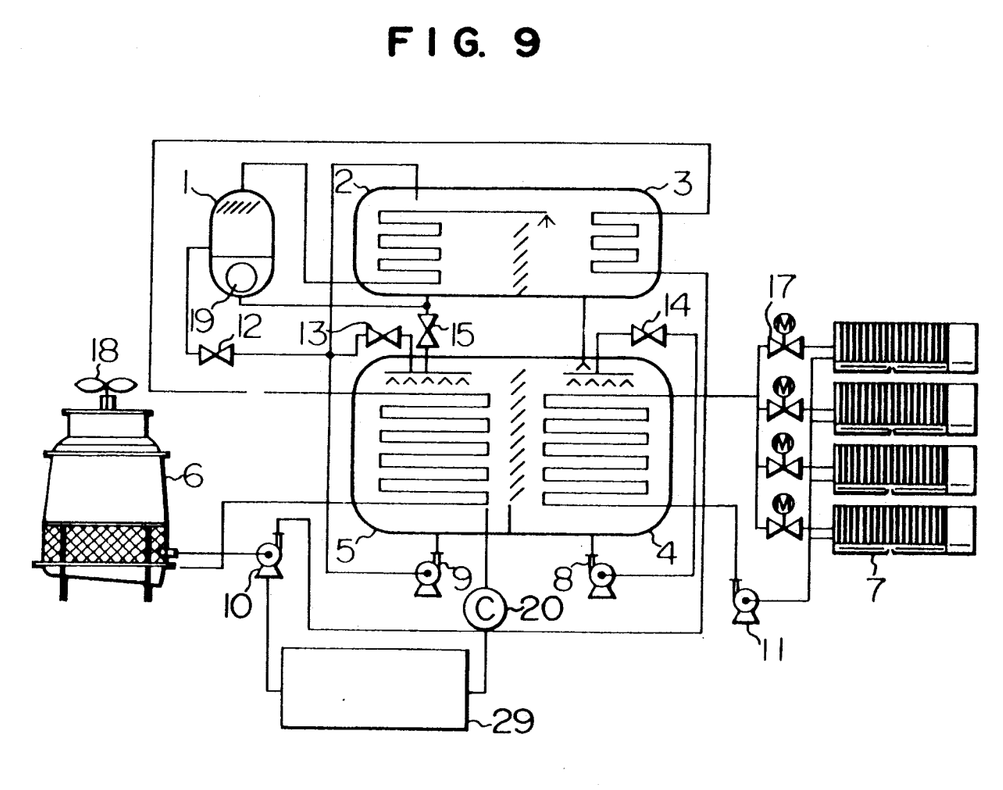
FIG. 9 is a diagram of a cycle flow, showing a further embodiment of an absorption chiller heater according to the invention.
Figure 10A:
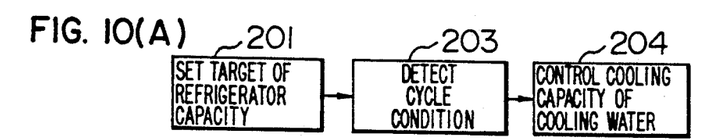
FIGS. 10(A)-10(G) are diagrams showing various kinds of combination examples in the invention.
Figure 10B:
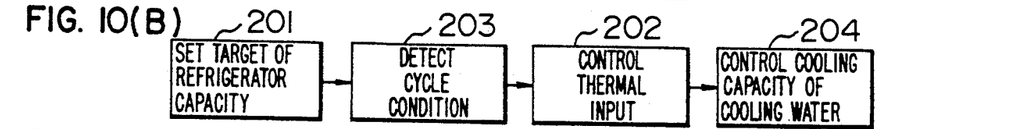
Figure 10C:
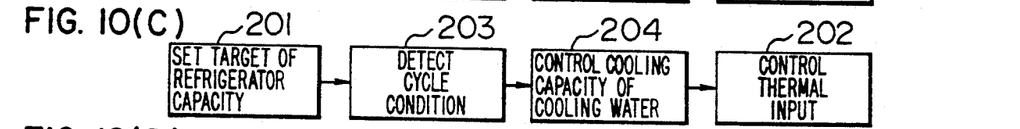
Figure 10D:
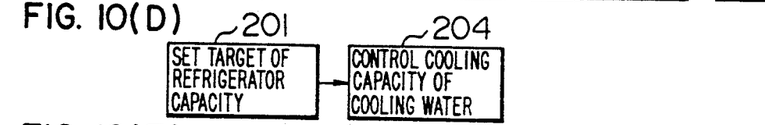
Figure 10E:
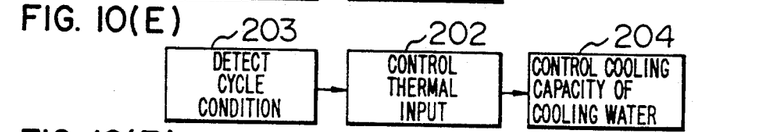
Figure 10F:
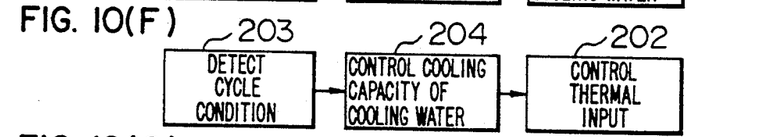
Figure 10G:
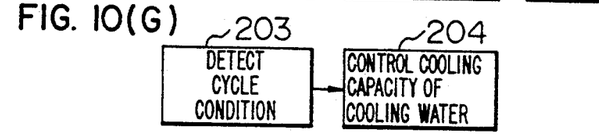

As another method for Steps 203 and 204 shown in FIG. 2, a thermometer 21 for measuring the temperature of the refrigerant in the evaporator 4 may be installed, as shown in one embodiment of FIG. 5, so that the three-way valve 16 can be controlled by a controller 25 in such a manner that the refrigerant temperature measured by this thermometer will not be the freezing temperature or less. Also, as shown in one embodiment of FIG. 6, a thermometer 22 for measuring the temperature of the chilled water at the outlet of the evaporator 4 may be installed so that the three-way valve 16 can be controlled by a controller 26 in accordance with the chilled water temperature measured by this thermometer. Further, as shown in one embodiment of FIG. 7, a pressure gauge 23 for measuring the pressure in the absorber 5 may be installed so that the three-way valve 16 can be controlled by a controller 27 in accordance with the pressure measured by this pressure gauge. In the above-described embodiments of FIGS. 1 and 5 to 7, the opening degree control of the three-way valve is employed as a method for controlling the refrigerant temperature by the cooling water. However, as shown in FIG. 8, the amount of air supply by the air supply fan 18 of the cooling tower 6 may be controlled by a controller 28 in accordance with the concentration of the solution in the absorber 5 (or the temperature of the refrigerant in the evaporator 4 or chilled water temperature or the pressure in the absorber as in FIG. 5, 6 or 7). As shown in FIG. 9, the rotational speed of the cooling water circulation pump 10 may be controlled by a controller 29. In the embodiment of FIG. 9, a greater effect can be produced by flowing the cooling water in the condenser 3 and the absorber 5 in this order. In FIGS. 5 to 9, substantially the same component parts as those shown in FIG. 2 are denoted by common reference numerals.

Although various methods for realizing the steps shown in FIG. 2 are explained above, it is possible to adopt a plurality of methods at once for each of the steps, and also, such methods of the steps can be combined freely. FIGS. 10(A)-10(G) illustrate seven of different possible combinations.

According to the present invention, as described heretofore, the refrigeration capacity of the absorption chiller heater can be varied from 0% to 100% without freezing of the coolant, by controlling the cooling water temperature in accordance with the refrigeration load so that the user of an air-conditioned room can freely change the capacity of the indoor air conditioner without knowing operational conditions of the outdoor air conditioning apparatus.

What is claimed is:

1. A control method of an absorption chiller heater, the method comprising the steps of detecting a refrigeration demand of the absorption chiller heater by a first detection means, detecting a condition of refrigerant in an evaporator of the absorption chiller heater by a second detection means, controlling a thermal input to a high temperature regenerator of the absorption chiller heater so that a thermal output of the absorption chiller heater during a cooling operation follows a refrigeration demand detected by said first detection means, and controlling the cooling capacity of cooling water in an absorber in accordance with said condition of the refrigerant detected by said second detection means so that the refrigerant in the evaporator will not freeze.

2. A control apparatus of an absorption chiller heater, comprising a first detection means for detecting a refrigeration demand of the absorption chiller heater, a second detection means for detecting a condition of refrigerant in an evaporator of the absorption chiller heater, a first control means for controlling a thermal input to a high temperature regenerator of the absorption chiller heater so that a thermal output of the absorption chiller heater during cooling operation follows up the refrigeration demand detected by said first detection means, and a second control means for controlling the cooling capacity of cooling water in an absorber in accordance with said condition of the refrigerant detected by said second detection means so that the refrigerant in said evaporator will not be frozen.

3. A control apparatus of an absorption chiller heater according to claim 2, wherein the first detection means detects the refrigeration demand from an opening degree of a chilled water flow rate regulation valve for controlling the amount of chilled water supplied to a load, which chilled water is circulated from the absorption chiller heater to the load.

4. A control apparatus of an absorption chiller heater according to claim 3, wherein the first detection means detects the refrigeration demand from a difference between temperatures of chilled water at the outlet and inlet of the absorption chiller heater, which chilled water is circulated from the absorption chiller heater to a load, and a flow rate of said chilled water.

5. A control apparatus of an absorption chiller heater according to claim 2, wherein the first detection means detects a value corresponding to a time from a preset time schedule and outputs it as the refrigeration demand of the absorption chiller heater.

6. A control apparatus of an absorption chiller heater according to claim 2, wherein a thermal input means of the high temperature regenerator is a burner, and the first control means controls the thermal input by on-off control of said burner when the refrigeration demand detected by said first detection means is a predetermined ratio or less with respect to the rated refrigerating capacity of the absorption chiller heater 7. A control apparatus of an absorption chiller heater according to claim 2 wherein a thermal input means of the high temperature regenerator is a plurality of burners, and the first control means controls the thermal input by operating part of said plurality of burners when the refrigeration demand detected by said first detection means is a predetermined ratio or less with respect to the rated refrigerating capacity of the absorption chiller heater.

8. A control apparatus of an absorption chiller heater according to claim 2, wherein the second control means detects a temperature and a concentration of absorbing solution at the outlet of the absorber and outputs them as the refrigerant condition.

9. A control apparatus of an absorption chiller heater according to claim 2, wherein the second control means detects a pressure of refrigerant vapor in the absorber and outputs it as the refrigerant condition.

10. A control apparatus of an absorption chiller heater according to claim 2, wherein the second control means detects a temperature of the refrigerant in the evaporator of the absorption chiller heater and outputs it as the refrigerant condition.

11. A control apparatus of an absorption chiller heater according to claim 2, wherein the second control means detects a temperature of chilled water at the outlet of the evaporator of the absorption chiller heater and outputs it as the refrigerant condition 12. A control apparatus of an absorption chiller heater according to claim 2, wherein the second control means controls an opening degree of a cooling water flow rate regulation valve in accordance with the refrigerant condition detected by said second detection means.

13. A control apparatus of an absorption chiller heater according to claim 2, wherein the second control means controls an amount of air supply by a fan of a cooling tower for cooling the cooling water in accordance with the refrigerant condition detected by said second detection means.

14. A control apparatus of an absorption chiller heater according to claim 2, wherein the second control means controls a rotational speed of a pump for circulating the cooling water in accordance with the refrigerant condition detected by said second detection means.

* * * * *